United States Patent [19]

Kobayashi et al.

[11] Patent Number: 4,679,135
[45] Date of Patent: Jul. 7, 1987

[54] CONTROL APPARATUS

[75] Inventors: Takeshi Kobayashi, Hadano; Ryouichi Ishii; Tomoyoshi Kitamoto, both of Hiratsuka, all of Japan

[73] Assignee: The Japan Tobacco & Salt Public Corporation, Tokyo, Japan

[21] Appl. No.: 686,356

[22] Filed: Dec. 26, 1984

[30] Foreign Application Priority Data

Dec. 26, 1983 [JP] Japan .................................. 58-243776

[51] Int. Cl.⁴ ...................... G05B 19/10; G05B 23/02; G05B 19/02
[52] U.S. Cl. .................................... 364/146; 364/188; 364/709; 340/365 VL; 340/712
[58] Field of Search ............... 364/146, 147, 171, 188, 364/709, 710; 340/365 UL, 712, 705, 734, 815.06, 815.07, 815.12, 815.13

[56] References Cited

U.S. PATENT DOCUMENTS

| | | | |
|---|---|---|---|
| 3,743,009 | 7/1973 | Dagerford | 165/11.1 |
| 4,418,381 | 11/1983 | Molusis | 364/157 |
| 4,431,988 | 2/1984 | Molusis | 340/365 UL |
| 4,551,717 | 11/1985 | Dreher | 340/365 UL |

OTHER PUBLICATIONS

From Desktop to Plant Floor, a CRT is the Control Operator's Window on the Process; S. J. Bailey; *Control Engineering;* Jun. 1984; pp. 86–90.

*Primary Examiner*—Jerry Smith
*Assistant Examiner*—Allen MacDonald
*Attorney, Agent, or Firm*—Armstrong, Nikaido, Marmelstein & Kubovcik

[57] ABSTRACT

A control apparatus including an operating panel means having illuminable switches which produce operation data upon operation by an operator and which display by illumination the status of operation of a machine equipment to be controlled, and an external control means which controls the machine equipment in a sequential manner according to a predetermined program on the operation data provided from the operating panel means and detection signals provided from the machine equipment and which illuminates the illuminable of the operating panel means. The operation panel means has an operating panel composed of a large number of such illuminable switches arranged in a matrix form. A specific operation data is produced by operation of a predetermined illuminable switch in the operating panel and the status of operation of the machine equipment is displayed by illumination of the operated illuminable switch. Even when the object of control or the contents of operation are changed, it is not necessary to redesign the entire apparatus, therefore a more efficient design work and the reduction of cost can be attained.

7 Claims, 18 Drawing Figures

FIG.7b LED

| NO | Contents |
|---|---|
| 1 | SW data 0 |
| 2 | SW data 1 |
| 3 | SW data 2 |
| 4 | SW data 3 |
| 5 | SW data 4 |
| 6 | SW data 5 |
| 7 | SW data 6 |
| 8 | SW data 7 |
| 9 | SW address 0 |
| 10 | SW address 1 |
| 11 | SW address 2 |
| 12 | SW address 3 |
| 13 | SW select signal 0 |
| 14 | SW select signal 1 |
| 15 | Data valid |
| 16 | Data invalid |

FIG.12b

| NO | Contents |
|---|---|
| 1 | LED data 0 |
| 2 | LED data 1 |
| 3 | LED data 2 |
| 4 | LED data 3 |
| 5 | LED data 4 |
| 6 | LED data 5 |
| 7 | LED data 6 |
| 8 | LED data 7 |
| 9 | LED data 8 |
| 10 | LED data 9 |
| 11 | LED data A |
| 12 | LED data B |
| 13 | LED data C |
| 14 | LED data D |
| 15 | LED data E |
| 16 | LED data F |

FIG.12c

| NO | Contents |
|---|---|
| 1 | LED data 10 |
| 2 | LED data 11 |
| 3 | LED data 12 |
| 4 | LED data 13 |
| 5 | LED data 14 |
| 6 | LED data 15 |
| 7 | LED data 16 |
| 8 | LED data 17 |
| 9 | LED data 18 |
| 10 | LED data 19 |
| 11 | LED data 1A |
| 12 | LED data 1B |
| 13 | LED data 1C |
| 14 | LED data 1D |
| 15 | LED data 1E |
| 16 | LED data 1F |

FIG.12d

| NO | Contents |
|---|---|
| 1 | LED address 0 |
| 2 | LED address 1 |
| 3 | LED address 2 |
| 4 | LED address 3 |
| 5 | Strobo |
| 6 | Clear |
| 7 | All-on |
| 8 | Test |
| 9 | |
| 10 | |
| 11 | |
| 12 | |
| 13 | |
| 14 | |
| 15 | |
| 16 | |

FIG. 14

CONTROL APPARATUS

BACKGROUND OF THE INVENTION

The present invention relates to a control apparatus such as a control board for controlling various manufacturing machine equipment.

Recently, manufacturing machine equipment have been becoming more and more complicated and diversified. At the same time, a high level of sequential processing or data processing has been demanded for the control boards which control the machine equipment, and an external control means such as a programmable sequential controller has been used for sequential processing.

Generally, a control board is provided with an operating panel and a sequential controller which controls the machine equipment in a sequential manner according to predetermined operations on the basis of operating data input from the operating panel and detection signals provided from the machine equipment and which causes the operating panel to display the status of operation of the machine equipment.

In such a conventional control board, however, a dedicated operating panel has been fabricated for each piece of machine equipment to be sequential-controlled, and therefore a part or the entire operating panel must be replaced at every change of the object or contents of sequential control.

SUMMARY OF THE INVENTION

The present invention has been accomplished for eliminating the above-mentioned inconvenience involved in the prior art. One object of the present invention is to provide a control apparatus capable of attaining versatility by standardization, that is, eliminating the need of replacing the entire operating panel even when the object or contents of sequential control are changed, and thereby attaining a more efficient design and a reduction in cost.

In order to achieve the above-mentioned object, the control apparatus of the present invention is provided with an operating panel means having illuminable switches which produce operation data upon operation by an operator and which display by illumination the status of operation of the machine equipment to be controlled. Also provided is an external control means which controls the machine equipment in a sequential manner according to a predetermined program on the basis of the operation data provided from the operating panel means. Detection signals are provided from the machine equipment which illuminates the illuminable switches of the operating panel means. The operating panel means has an operating panel composed of a large number of illuminable switches arranged in a matrix form, in which specific operation data is produced by operation of a predetermined illuminable switch in the operating panel. The status of operation of the machine equipment is displayed by illumination of the thus-operated illuminable switch.

DESCRIPTION OF A PREFERRED EMBODIMENT

An embodiment of the present invention will be described in detail hereinunder with reference to the drawings.

Figure 1:
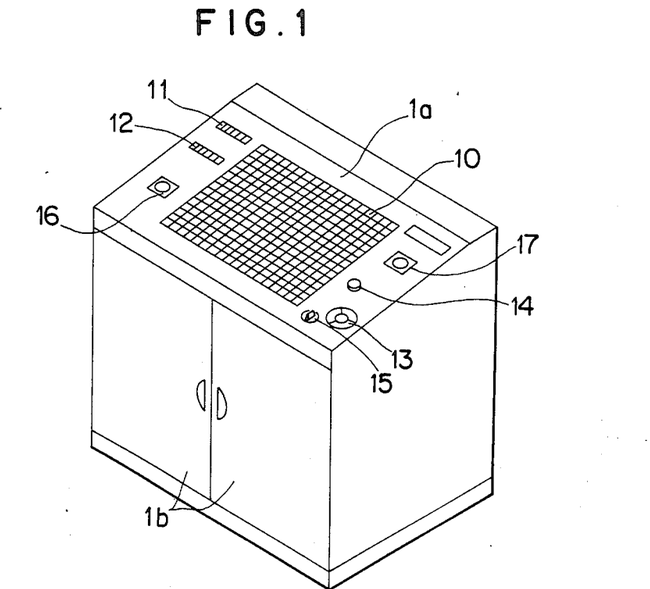
FIG. 1 is a perspective view of a control apparatus according to an embodiment of the present invention.

FIG. 1 is a view showing an external appearance of a disc type control board constructed according to the present invention. An operating panel device 10, is provided on a control board surface 1a. A data display unit 11, a data input switch 12, an emergency stop push-button 13, a board stop push-button 14, an operating panel enable/disable switch 15, an operation sound buzzer 16 and a fault alarm buzzer 17 are also provided on the control board.

On both front and rear sides of the control board are provided double-leaf doors 1b (only a front door shown). In the interior of the control board are mounted sequential controller, no-fuse circuit breaker, electromagnetic contactor, electromagnetic switch, transformer, DC regulated power supply, relay, etc.

Figure 2:
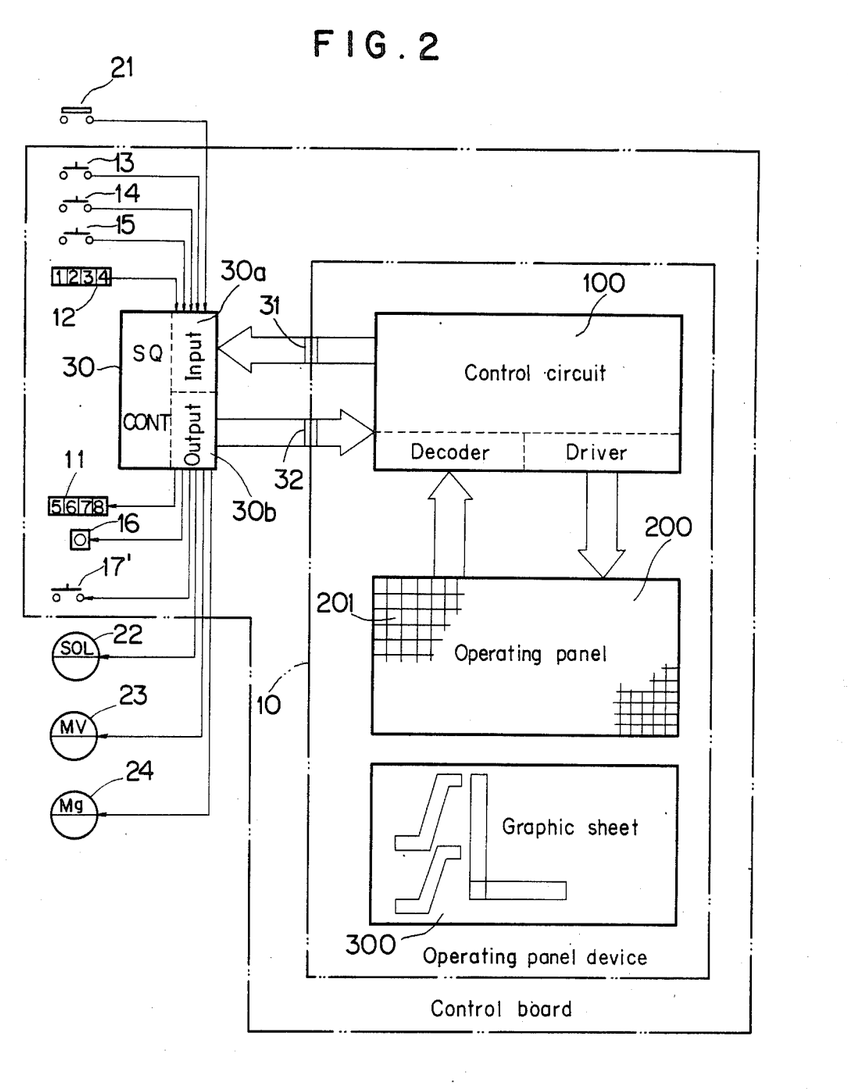
FIG. 2 is a view showing the entire construction of the apparatus.

In FIG. 2, which is a schematic view showing the construction of the control board, the reference numeral 30 denotes a sequential controller with an input 30a for receiving detection signals from various detectors 21 attached to machine equipment such as a limit switch, a proximity (contactless) switch and a photoelectric switch, switch signals from the foregoing switches 12-15 and operation data from the operating panel device 10. The controller 30 then performs sequential processing for these signals and thereafter produces at an output 30b control signals to various loads attached to the machine equipment such as a solenoid 22 electromagnetic valve 23 and electromagnetic switch 24. In addition, operation signals are output to the display unit 11, buzzer 16 and contact 17' of the buzzer 17 which are disposed on the control board surface and illumination data to the operating panel device 10.

The operating panel device 10 is connected to input and output 30a and 30b of the sequence controller 30 through connectors 31 and 32. The panel 10 is composed of a control circuit 100 which inputs and outputs the above operation data and illumination data through the connectors 31 and 32, an operation panel 200 which comprises illuminable switches 201 arranged in a matrix form on a printed circuit board, and a graphic sheet 300 superposed on the operating panel 200 and graphically showing the correlation between various portions of the machine equipment and the illuminable switches 201.

Figure 3:
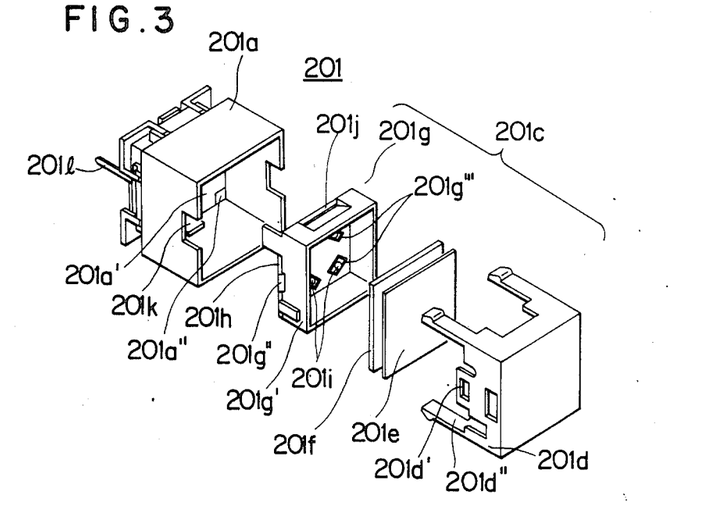
FIG. 3 is an exploded perspective view of an illuminable switch.
Figure 4:
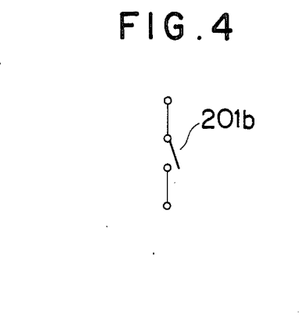
FIGS. 4 and 5 are circuit diagrams each showing a circuit configuration of an illuminable switch.

The illuminable switch 201 uses a switch of a unit structure as shown in FIG. 3 (exploded perspective view) capable of being mounted on a printed circuit board so that the packing density can be enhanced. In FIG. 3, a unit case 201a is integrally formed of resin and is provided on bottom 201a' with a normally opened momentary switch 201b as shown in FIG. 4 which turns on when the upper surface is pressed and turns off upon releasing the pressing force.

An illumination unit 201c, which is removably attached to the unit case 201a, comprises a lens 201d which is integrally formed of a transparent resin, a filter 201e, a name plate 201f and an LED (light emitting diode) unit 201g. These are unitized by engaging lugs 201g" of a reflector 201g' of the LED unit 201g with recesses 201d' of the lens 201d so as to hold therebetween the filter 201e and name plate 201f. In this state, legs 201d" having hooks at the respective fore ends and extending from the four corners of the lens 201d are aligned with the unit case 201a and brought into engagement with key slots 201a" so as to be slidable within a predetermined range, whereby the LED illuminating type switch 201 is constituted.

Figure 5:
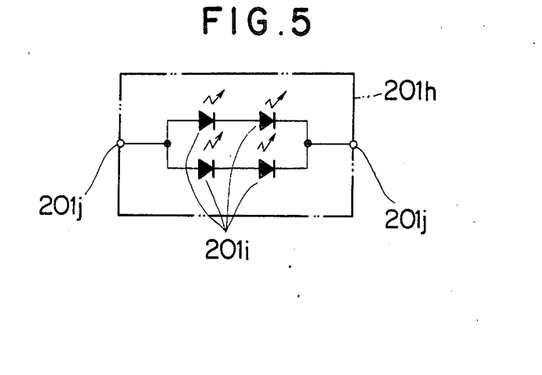

In the bottom of the reflector 201g' of the LED unit 201g are formed four apertures 201g''', and four LED's 201i, which are series-parallel connected on a printed substrate 201h as shown in FIG. 5. The aperatures and LED's are faced on the apertures 201g''' in a one-to-one relation, respectively, thereby ensuring a uniform planar illumination. At opposed edges of the printed substrate 201h are provided terminals 201j, which are in contact with electrodes 201k formed in the unit case 201a. Projecting from the unit case 201a are lead terminals 201l, which are connected to both ends of the switch 201b and the electrodes 201k. By soldering the lead terminals 201l to a pattern of a printed circuit substrate, the switches 201 are arranged in a matrix form.

Figure 6:
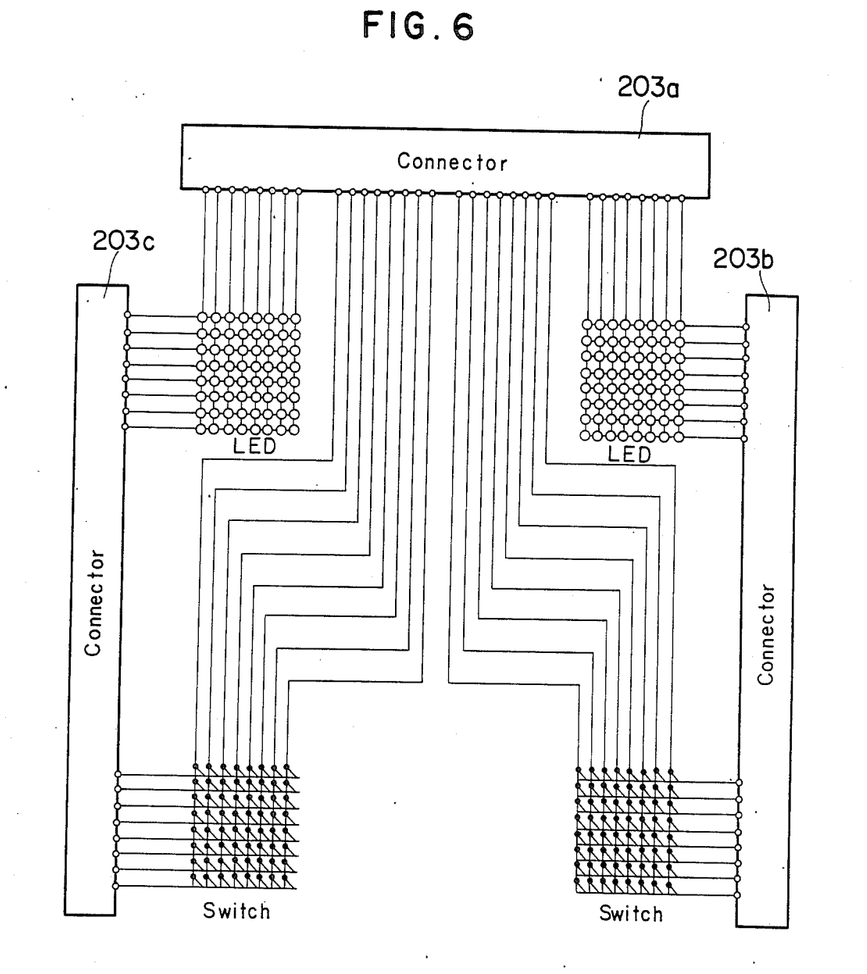
FIG. 6 is an electric wiring diagram of a part of an operating panel.
Figures 7A, 7B, 8, 11:
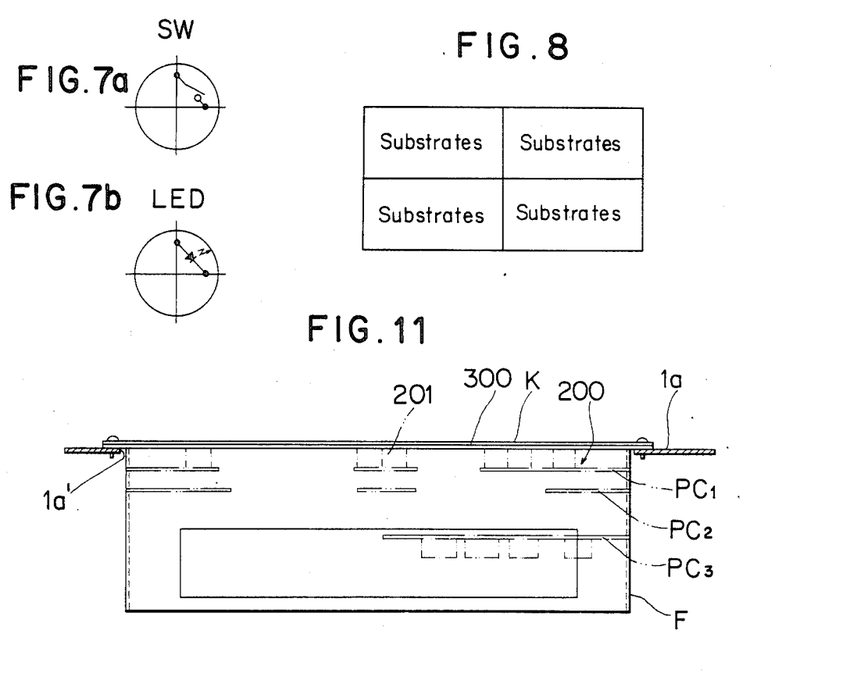
FIGS. 7a and 7b are detail views of a part of FIG. 6.
FIG. 8 is a configuration diagram of the operating panel.
FIG. 11 is a side view showing a substrate configuration in the operating panel means.
Figure 9:
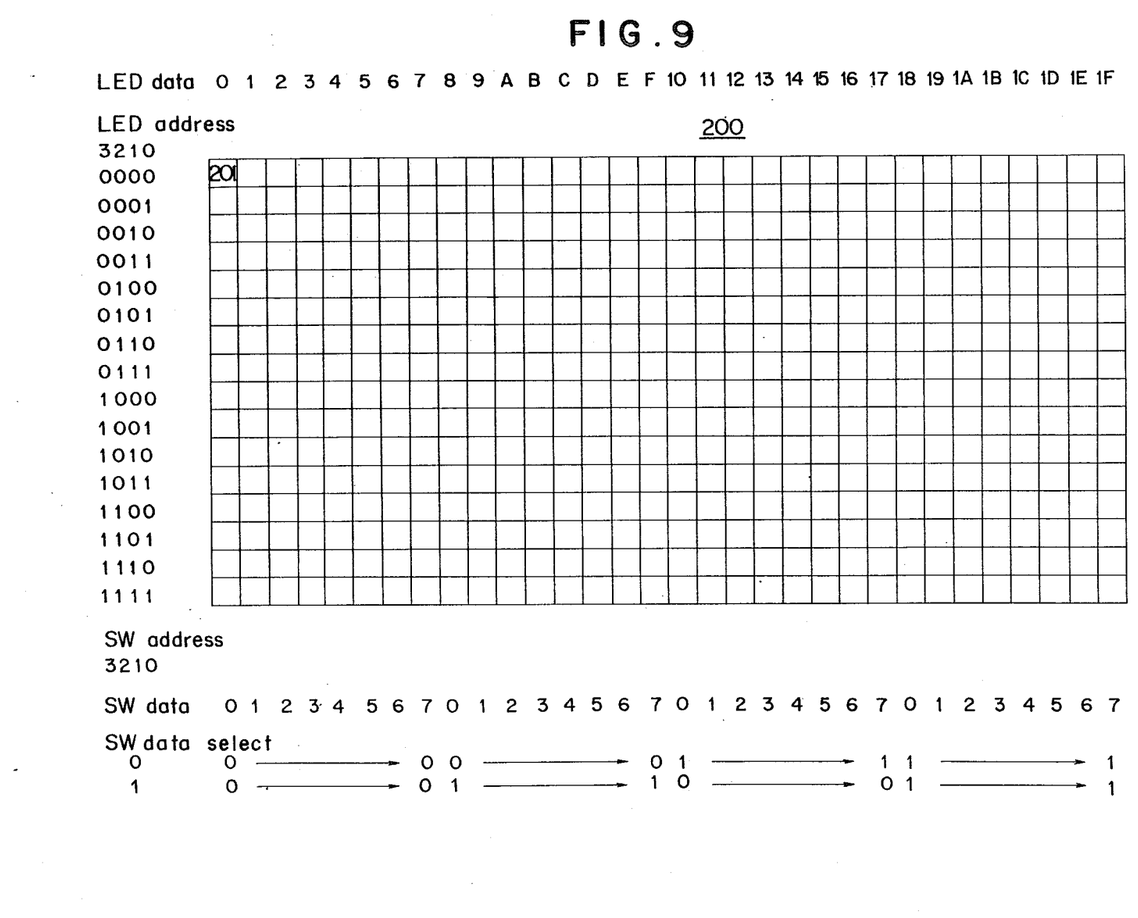
FIG. 9 is an explanatory view showing signal allocation in the operating panel.

FIG. 6 shows a connection of a total of 128 (8 vertically×16 laterally in the figure) LED illuminating switches 201 arranged in a matrix form on a printed circuit substrate, in which the circle and black dot marks represent in a simplified form the state of connection between the switch and LED shown in FIGS. 7a and 7b. By arranging four such printed circuit substrates each with 128 LED illuminating switches 201 arranged thereon, in such a form as shown in FIG. 8, there is obtained an operating panel 200 with a total of 512 (16 vertically×32 laterally) illuminable switches 201 arranged in such a matrix form as shown in FIG. 9. The switches 201b and the LED's, which constitute each illuminable switch on each printed circuit substrate, are connected to the control circuit 100 through connectors 203a, 203b and 203c.

Further, as shown in FIG. 9, the LED of each illuminable switch 201 on the operating panel 200 is specified by LED data comprising hexadecimal digits of 0 to 1F and binary digits of 0000 to 1111, while the switch is specified by switch data comprising 0 to 7 digits, address data comprising binary digits of 0000 to 1111 and switch data select comprising binary digits of 00 to 11.

Figure 10:
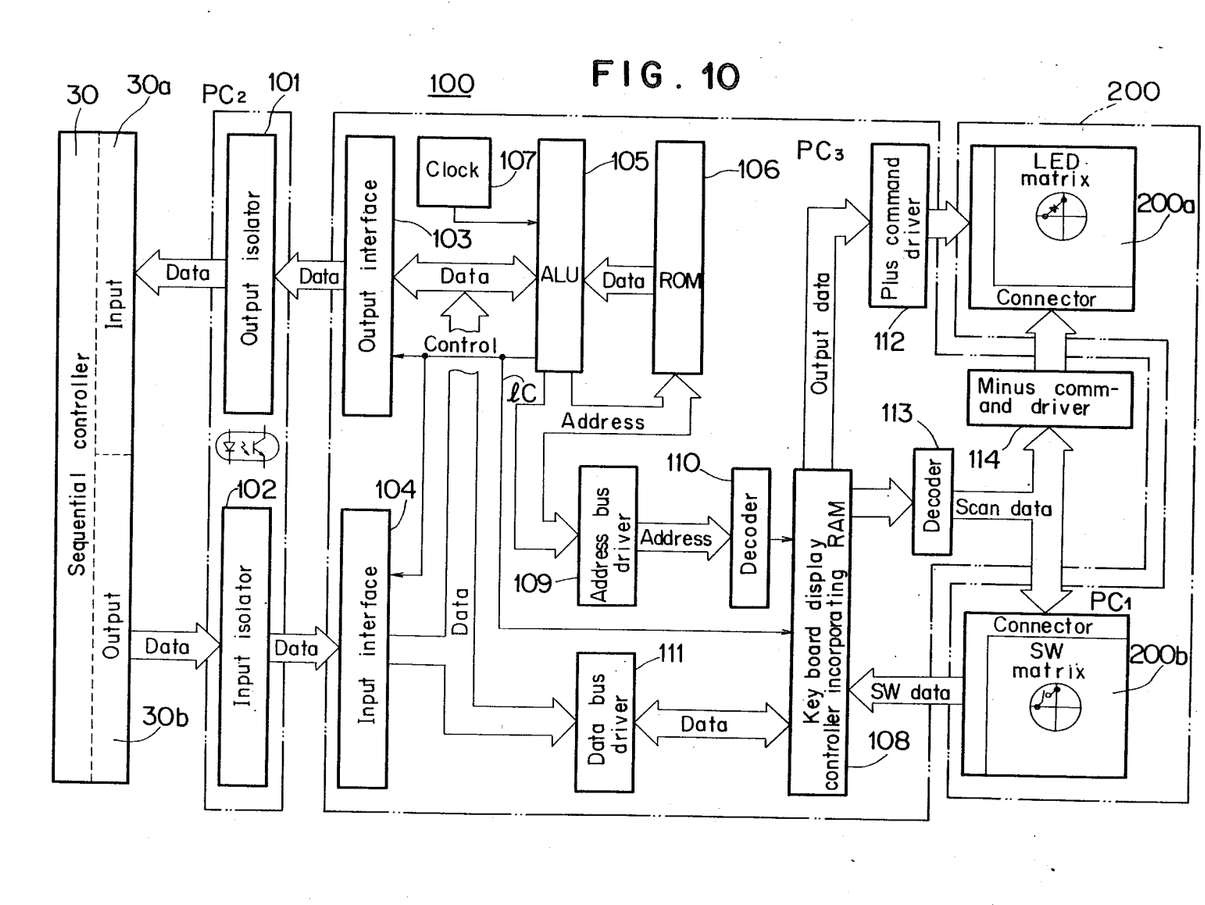
FIG. 10 is a block diagram showing a circuit configuration of an operating panel means.
Figure 12A:
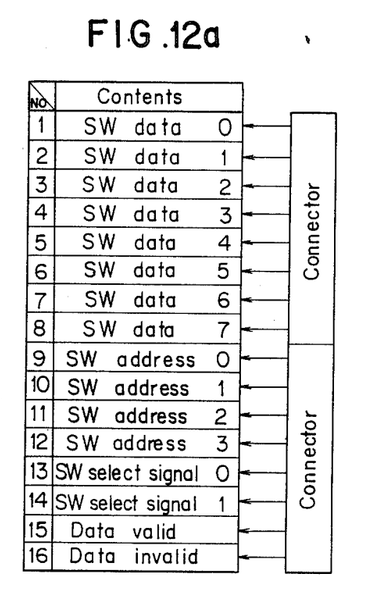
FIGS. 12a thru 12d are explanatory views showing an example of input/output cards of a sequential controller.
Figure 12B:
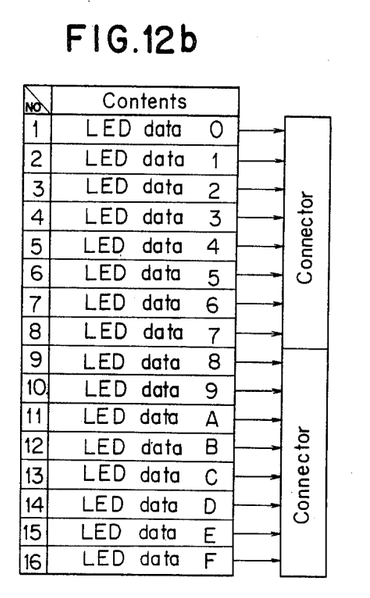
Figure 12C:
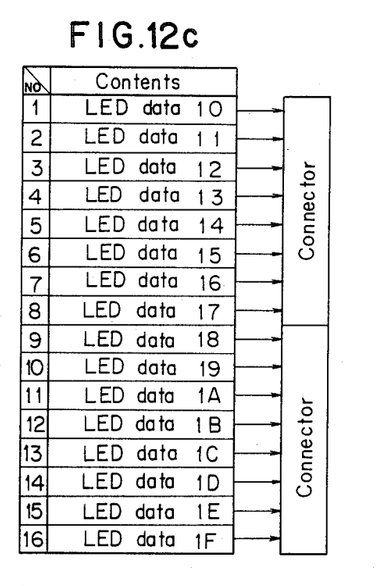
Figure 12D:
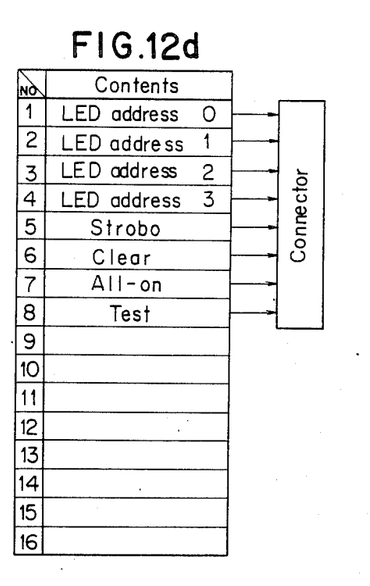

FIG. 10 is a block diagram showing a concrete example of the control circuit 100, in which the numerals 101 and 102 denote an output isolator and an input isolator, respectively. In each isolator, input and output are separated through a photo coupler to provide a circuit strong against noise. The numerals 103 and 104 denote an output interface and an input interface, respectively, each of which performs a signal voltage transformation. The numerals 105, 106 and 107 denote an arithmetic and logical unit (ALU), a read-only memory (ROM) and a clock generator, respectively. The ALU 105 controls input and output of data, namely, receipt and delivery of data between it and the sequential controller 30 in accordance with a program stored in the ROM 106 as will be described later.

The data transmitted through the isolator 101 to the sequential controller 30 comprise a total of 16 bits which are 8 bits of switch data, 2 bits of data select signal, 4 bits of switch address data and one bit each of data valid signal and data invalid signal. On the other hand, the data fed from the sequential controller 30 to the control circuit through the isolator 102 are LED illumination data comprising a total of 40 bits which are 32 bits of LED data, 4 bits of address data and one bit each of Strobo, Clear, All-On and Test signals.

The numeral 108 denotes a keyboard display controller incorporating a random access memory (RAM). The keyboard display controller 108 has an operation data storage area which stores operation data on the operated switch among the illuminable switches 201 on the operating panel 200, and an illumination data storage area which stores illumination data on the illuminable switch 201 to be illuminated on the operating panel 200 provided from the sequential controller 30. Read and write operations from each of these storage areas are performed under the control of the ALU 105.

The reference mark 1c denotes a control signal line for applying control signals from the ALU 15 to the interfaces 103 and 104 and RAM 108. The numeral 109 denotes an address bus driver for applying to a decoder 110 an address fed from the ALU 105 through an address bus. The decoder 110 decodes the thus-applied address and performs addressing for the keyboard display controller 108. The numeral 111 denotes a data bus driver for input and output of various data between the interfaces 103, 104, ALU 105 and the keyboard display controller 108.

The numeral 112 denotes a plus command driver for driving, with LED data in the illumination data, anode rays in an LED matrix 200a which is constituted of the LED's of the illuminable switch 201 on the operating panel 200. The numeral 113 denotes a decoder which decodes address data in the illumination data to obtain specific data for illuminating LED. The numeral denotes a minus command driver for driving cathode rays in the LED matrix 200a in accordance with the specific data obtained by the decoder 113. The decoder 113 also outputs scan data used when the operation data is written from a switch matrix 200b to the keyboard display controller 108. The switch matrix 200b is composed of the switches of the illuminable switches 201 on the operating panel 200.

The operating panel device, as shown in FIG. 11, is of a three-layer structure comprising successively from the upper side four switch substrates PC₁ which constitute the operating panel 200, an isolator substrate PC₂ which constitute the isolators 101 and 102, and a CPU substrate PC₃ which constitutes a central processing unit (CPU) by combination of ALU 105, ROM 106, keyboard display controller 108, etc. The panel device, which is thus constructed and supported by a frame F, is removably fitted in an opening 1a' formed centrally in the control board surface 1a. In this case, a graphic sheet 300 is held between a style strip K which masks unnecessary portion and the operating panel 200.

The sequential controller 30 has a large number of input/output cards, of which those for input and output of signals between the controller 30 and the control circuit 100 are shown in FIGS. 12a to 12d. The card (a) is an input card for receiving DC inputs from the control circuit 100. The input Nos. 1 to 8 control of switch data 0 to 7, Nos. 9 to 12 control switch addresses 0 to 3, Nos. 13 and 14 control switch select signals 0 and 1, and Nos. 15 and 16 control date valid and data invalid signals respectively. The cards (b) to (d) are output cards for providing DC outputs from the sequential controller 30 to the control circuit 100. Output Nos. 1 to 16 of the card (b) control LED data 0 to F, output Nos. 1 to 16 of the card (c) cntrol LED data 10 to 1F, output Nos. 1 to 4 of the card (d) control LED addresses 0 to 3, and Nos. 5, 6, 7 and 8 control Strobo, Clear, All-On and Test signals, respectively. These cards are connected to the control circuit 100 through connectors.

In addition to the above cards, the sequential controller 30 has other cards controlling DC inputs from the digital switch 12, DC inputs from the detectors 21 attached to various points of the machine equipment such as limit switch, photoelectric detector, proximity switch, electrostatic switch and reed switch, DC inputs such as Board Stop, No-fuse Circuit Breaker OFF and Operation Circuit Stop, DC outputs to the data display unit 11, and AC outputs to loads such as motor and electromagnetic valve.

The ALU 105 in the control circuit 100 performs operations in accordance with the program stored in the ROM 106. These operations will be explained below with reference to the flow chart of FIG. 13.

Figure 13:
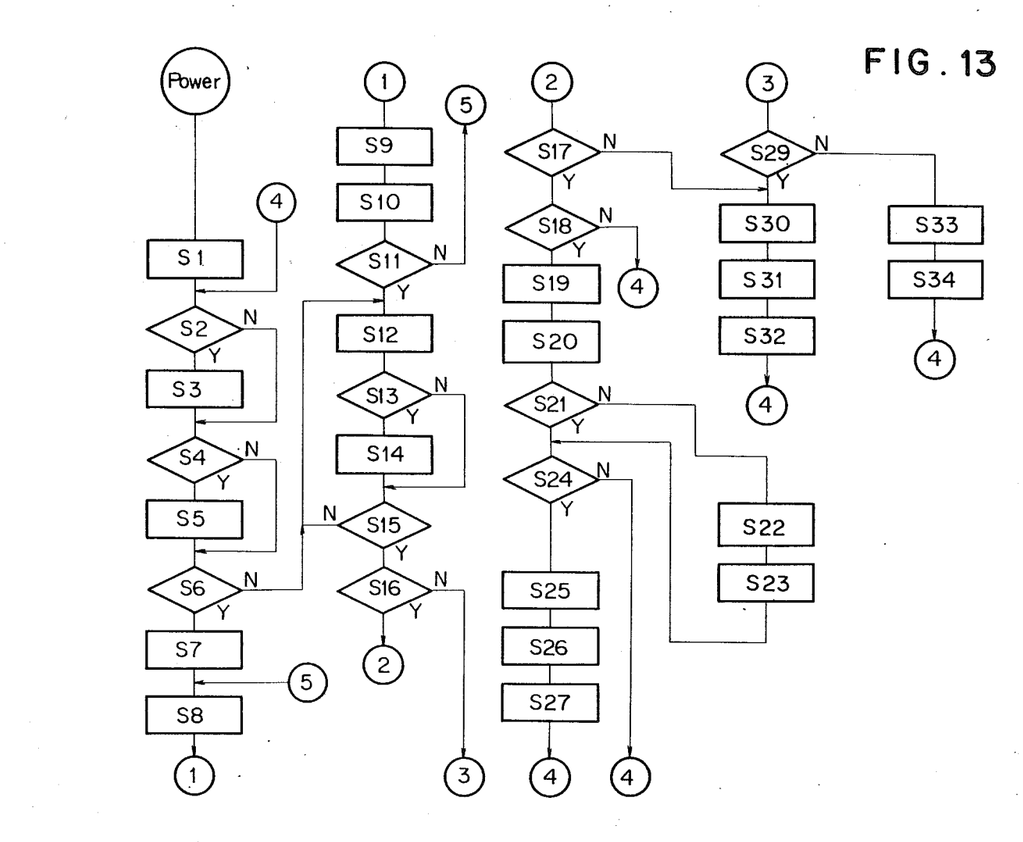
FIG. 13 is a flow chart showing operations of a control circuit of the operating panel means.

Operation is started by turning on the power supply of the apparatus, and first initialization is performed in step S1 for the interfaces 103 and 104 and the keyboard display controller 108. Next, in step S2, program determines whether an ALL-ON signal from the sequential controller 30 is present or not. The ALL-ON signal is for lighting the LED's of all illuminable switches 201 on the operating panel 200 and inspecting their illumination. If the result is YES, the LED's of all illuminable switches 201 are turned on in step S3. On the other hand, if the result is NO, the program advances to step S4, skipping over step S3.

In step S4, the program determines whether a Clear signal from the sequential controller 30 is present or not. The Clear signal is for turning off the lighting LED's. If the result is YES, all the LED's are turned off in the next step S5, while if the result in step S4 is NO, the program advances to step S6, skipping over step S5.

In step S6, the program determines whether a Strobo signal from the sequential controller 30 is present or not. The Strobo signal is for showing that the LED data to be output is ready on the side of the sequential controller 30. If the result is YES, a 2 millisecond clock is counted down for the stabilization of data in step S7. Thereafter, the LED address data is read in step S8, and the LED data is read in step S9. In the next step S-10, the thus-read LED data are each written in a predetermined storage position of the illumination data storage area in the keyboard display controller 108 designated by the LED address, under control of ALU 106. In the subsequent step S11, the program determines whether all data has been completed written or not, and if the result is NO, the above steps S8 to S10 are repeated until all data is written, while if the result is YES, program advances to the next step S12.

In connection with step S6, if the result therein is NO, that is, if the Strobo signal from the sequential controller 30 is not present, the processings of steps S7 to S11 are not executed, and program advances directly from step S6 to step S12.

In step S12, the switch data stored in the operation storage area of the keyboard display controller 108 is read to the ALU 105, and then in step S13 the program determines whether the Test signal from the sequential controller 30 is present or not. The Test signal is for conducting a test as to whether the LED of a pushed illuminable switch 201 on the operating panel device 10 goes on or not. If the result is YES, then in step S14, LED data is written to the position corresponding to the operated switch in the illumination data storage area of the keyboard display controller 108. On the other hand, if the Clear signal is not present, the program advances to step S15, skipping over step S14.

In step S15, the program determines whether all switch data has been completely read or not. If the result is YES, the program advances to the next step S16, while if the result is NO, the steps S12 to S14 are repeated until all the switch data is read.

In step S16, the program determines whether the number of pushed switches in different addresses is at least one, and if the result is YES, the program advances to step S17. In step S17, the program determines whether the number of pushed switches in the same address is at least one, and if the result is YES, the program advances to step S18. In step S18, the program determines whether the Two-Push flag is off or not, and if the result is YES, process advances to step S19, while when the result is No, the program returns to step S2. In step S19, switch data to be output is read, and switch address data to be output is read in the next step S20.

Then, in step S21, the program determines whether the address data read in step S20 is coincident with the preceding address value, and if the result is NO, that address is temporarily stored in a register in the ALU 105 in step S22, then N value is set in another register in the next step S23. On the other hand, if the result in step S21 is YES, the program advances to step S24, in which the program determines whether the coincidence was continued N times or not. If the result is NO, the program returns to step S2. The N-time determination is performed to detect that the switch is held ON during a time t necessary for the execution of steps S2 to S21 multiplied by N, and thereby preventing an erroneous input caused by chattering or noise.

If the result in step S24 is YES, the address stored in step S22 is cleared in step S25, and then the Two-Push flag is turned on in the subsequent step S26. The Data Valid output is turned on in the next step S27. Thereafter, the program returns to step S2 and the subsequent steps are executed up to step S18, and if the result in step S18 is NO, the program again returns to step S2.

If the result in step S16 is NO, that is, if the number of pushed switches in different addresses is not one, the program advances to step S29, in which the program determines whether the number of pushed switches is two or more. If the result is YES, the Data Invalid output is turned on in the next step S30, and the Data Valid output is turned off in the subsequent step S31. Further, in the next step S32, the Two-Push flag is turned on and the program returns to step S2.

Where the result in step S17 is NO, the steps S30 to S32 are executed and then the program returns to step S2.

Further, where the result in step S29 is NO, it is assumed that there is no switch pushed, and program advances to step S33, in which the Data Valid output is turned off. Then, in step S34, the Two-Push flag is turned off and then the program returns to step S2.

The above processings will now be summarized. Upon application of power, initialization is performed. And according to the program, the All-ON signal is checked from the output of the sequential controller 30. If the All-ON signal is present, all the LED's are turned on so as to permit a lamp check. On the other hand, if the signal is not present, the lamp check processing is jumped over, and the Clear signal is checked.

If the Clear signal is present, all LED's are turned off, while if not present, this processing is jumped over and the Strobo signal from the sequential controller 30 indicating that the LED data is ready, is checked.

If a change is recognized in the Strobo signal, a 2 millisecond clock is counted down for the stabilization of data, and then the LED address data and the LED data are read and written to the illumination data storage area of the keyboard display controller 108. This processing is performed for all LED's. Unless there is a change in the Strobo signal, this processing is jumped over.

Next, the switch data is read from the keyboard display controller 108, and the Test signal from the sequential controller 30 is checked to determine if present. The Test signal is produced during an interruption of the operation of the sequential controller 30, and the data is written to the keyboard display controller 108 so that the LED of the pushed switch can be turned on. Consequently, the operation of the operating panel device 10 can be confirmed even without the sequential controller, and this is advantageous for the improvement of maintainability. If the Test signal is not present, this processing is jumped over.

Upon completion of writing all the switch data, the number of pushed switches is checked to determine if one is pushed. If there is only one pushed, the Two-Push flag is checked to determine if turned off, and if it is off, switch data and switch address data are read and collating is performed N times in order to enhance the reliability of data. If coincidence of collating is confirmed N times, the Two-Push flag is turned on, the Data Valid signal is produced and the program returns to the beginning. When the Two-Push flag is on, program returns directly to the beginning.

When the number of pushed switches are not one, the Data Invalid signal is produced, the Two-Push flag is turned on and the program returns to the beginning. When the Two-Push flag is again checked and is on, the program returns to the beginning. As this state is repeated, the sequential controller 30 drops the Strobo signal, so that the result of checking the Strobo signal becomes NO, the result of checking whether the number of pushed switch in different addresses is one or not also becomes NO, and a check is made as to whether the number of pushed switch is two or more. At this time, the switches are opened, so the Data Valid output is turned off, the Two-Push flag is also turned off and the program returns to the beginning.

The above operations are performed cyclically, and turning on and off of LED's of the LED illuminating switches as well as input and output of switch data are performed between the control circuit and the sequential controller 30.

Figure 14:
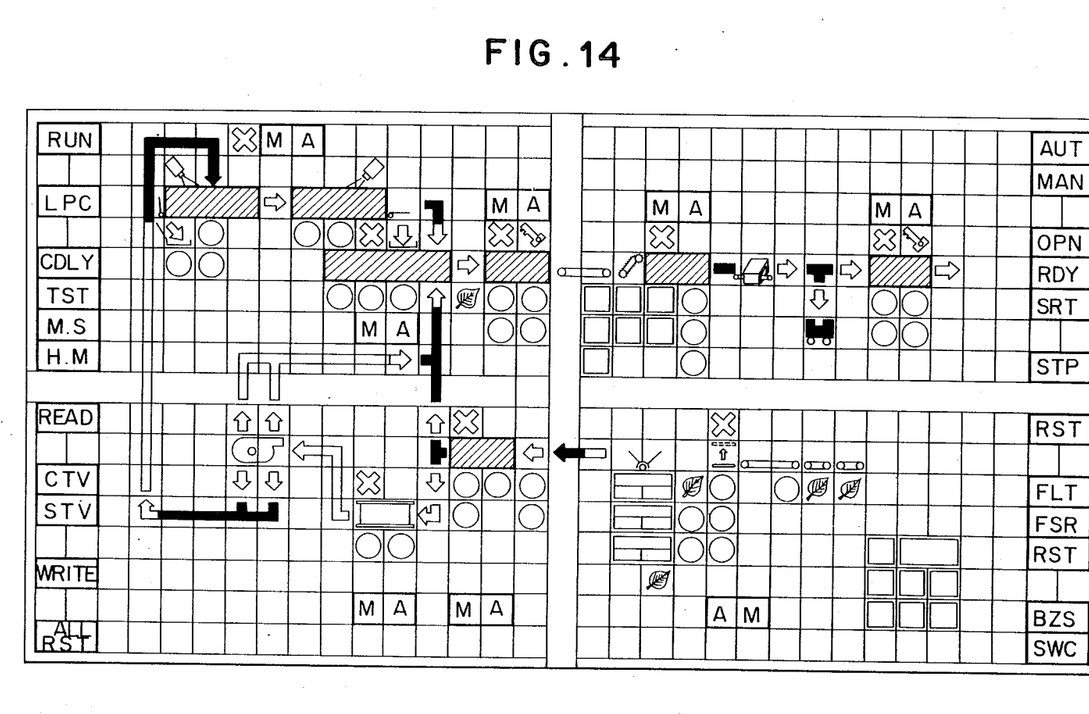
FIG. 14 is a plan view showing an example of a graphic sheet.

FIG. 14 shows an example of a pattern described on the graphic sheet 300 when the control apparatus is used for controlling a part of a tobacco manufacturing equipment.

In the illustrated pattern, switches and indications for automatic operation are arranged at the rightmost portion, and manufacturing steps are described in the central portion. Further, at the leftmost portion are arranged operating sections for clock processing and data processing to be performed by the sequential controller. The switches not inked-in are in use as illuminable switches.

Switches "AUT" and "MAN" on the right indicate manual or automatic operation for designating operation mode of the entire process, and manual and automatic switches "M" and "A" arranged in the central portion are switched over by the mode designation. In-operation indication "OPN" shows that the process is in automatic operation. Ready indication "RDY" shows that the process is in an initial state. Sequential start switch "SRT" is a switch for commanding an automatic operation of the process. Sequential stop switch "STP" is a switch for stopping the automatic operation. Restart switch "RST" is a switch for starting operation from a post-step so as not to cause clogging of raw material, the restart being performed upon completion of fault processing after a fault-stop of the process. Fault indication "FLT" is an indication showing the presence of fault in the automatic operation. Fault store indication "FSR" is an indication showing that fault is stored until the reset switch "RST" is depressed. The reset switch "RST" is a switch for restart after processing for the stored fault of the process. Buzzer stop switch "BZS" is a switch for stopping a fault indicating buzzer. Switch caution indication "SWC" is an indication showing that switches inside and outside the board are not switched yet to automatic operation mode.

The central portion shows the flow of the process, in which each square frame with oblique lines indicates an individual machine in the equipment. If this portion is depressed during the manual mode, the entire individual machine is operated, or one cycle operation is performed. The circular mark represents a motor for the individual machine, indicating the state of operation in rotation mode or is used as a manual operation switch during the manual mode, and it indicates an alternate function when used as the switch. The white arrow portion indicates a damper switch-over direction for an electromagnetic valve, a cylinder with motor, etc. and is used also as a driving switch in manual mode. The X mark indicates a fault portion of an individual machine in the process, and the key mark indicates that the safety switch of an individual machine is turned on, calling attention before start. In the right lower portion are arranged illuminable switches for the selection of a process route. The leaf mark indicates that raw material is present in that position, and Ms and As in an individual machine indicate switches used for switching to manual mode in that portion alone at the time of clogging of raw material.

"RUN" at the leftmost top is a flicker indication showing that the control operation of the sequential controller is being performed. "LC" means a Lamp Check switch for lighting all LED's. "CDLY" is a Clock Display which is a command switch for the sequential controller to effect read and write of clock data TS means. Timer Start which is a command switch for starting from 0 second of the time set the data input switch. "M.S" and "H.M" are "Minute-Second" and "Hour-Minute" switches for specifying the indication form in displaying time on the external data display unit.

"Read" switch is for commanding from the data input switch the timer counter number in the sequential controller. The data to be displayed on the data display unit is specified by selecting the present value or preset value. The change of data is performed by specifying the timer counter number with "Read", then specifying data for change by the data input switch and thereafter pushing "Write". "All Reset" is a command switch for resetting the internal storage data of the sequential controller and setting to initial value.

Although in the above embodiment the graphic sheet is used to represent the correlation between the illuminable switches on the operating panel and various portions of the machine equipment, the name plate of each illuminable switch may be used for the same purpose in place of such a graphic sheet.

According to the present invention, as set forth hereinabove, a specific illuminable switch on the operating panel composed of matrix-like arranged illuminable switches are operated to produce specific operation data, and thus a specific operation state is displayed by illumination of a specific illuminable switch. Therefore, even a change in the object of control or the contents of operation could be coped with by merely altering the function of each illuminable switch, thus eliminating the need of redesigning the entire apparatus. Consequently, various effects are obtained, for example, not only a more efficient design work but also the reduction of cost based on generalization can be attained.

What is claimed is:

1. A control apparatus comprising:
    an operating panel means having illuminable switches which produce operation data upon operation by an operator and which display by illumination the status of operation of a machine equipment to be controlled, and
    an external control means which controls the machine equipment in a sequential manner according to a predetermined program on the basis of the operation data provided from said operating panel means and detection signals provided from the machine equipment and which illuminates the illuminable switches of said operating panel means,
    said operating panel means having an operating panel composed of a large number of said illuminable switches arranged in a matrix form,
    wherein a specific operation data is produced by operation of a predetermined illuminable switch in said operating panel and the status of operation of the machine equipment is displayed by illumination of the operated illuminable switch and
    wherein said operating panel means is further provided with a storage means for temperarily storing the operation data produced by the operation of the illuminable switches and illumination data for specifying the illuminable switch to be illuminated, and a control section which controls the write and read of data to and from said storage means in accordance with a predetermined program and which controls in accordance with a predetermined program the delivery of the operation data stored in said storage means to said external control means and illumination of the illuminable switches based on the ilumination data stored in said storage means.

2. A control apparatus according to claim 1, wherein said operation data and illumination data comprise address data affixed to groups of the illuminable switches and data for specifying the illuminable switches of each said group.

3. A control apparatus according to claim 2, wherein said illuminable switch specifying data in each said operation data includes sub-data as plurally divided data thereof.

4. A control apparatus according to claim 1, wherein said operating panel means is further provided with a graphic sheet which is superposed removably on said operating panel and which represents the correlation between various portions of the machine equipment and the illuminable switches.

5. An operation control apparatus comprising:
    a sequence control means which executes each step of a program, in manual or automatic mode, for operating program-replacable machine system constructed by cascading a plurality of machines;
    operation panel means having switches which individually select a machine to be operated; and
    control means which outputs a signal to said sequence control means for specifying a machine selected by a switch when the program is manually executed, and decodes a signal from each machine and then outputs a signal to the operation panel for indicating operating status of said each machine in said machine system when the program is automatically executed, wherein said operation panel means includes
    a first group of conductors in columns and a second group of conductors in rows, arranged respectively in a first matrix form;
    switches electrically connected between conductors in said first group of conductors and conductors in said second group of conductors at cross points of said columns and rows of said first matrix and accommodated in housings thereat,
    a third group of conductors in columns and a fourth group of conductors in rows, arranged respectively in a second matrix form,
    light emitting elements electrically connected between conductors in said third group of conductors and conductors in said fourth group of conductors at cross points of said columns and rows of said second matrix and accommodated in said housings;
    a graphic sheet being mounted above said housings of said switches having symbols which express each machine and its operating condition in said machine system in the form of a process diagram and are individually illuminated by said light emitting elements and being replacable in accordance with said program;
    each conductor of said first through fourth group of conductors being connected to said control means,
    said control means detecting a switch operated by means of scanning the conductors of said first and second group of conductors, outputting the signal for specifying a specific machine selected by the switch to the sequence control means, causing the light emitting elements in the housing of the switch to emit light, and then indicating by illuminating the corresponding symbol on the graphic sheet that the machine is selected when the program is manually executed, said control means decoding the signal from each machine, causing the light emitting elements to emit light, and indicating the operating status of each machine in said machine system by illuminating the corresponding symbols on the graphic sheet when the program is automatically executed.

6. An operation control apparatus according to claim 5, wherein said operation control apparatus comprises a memory means to temporarily store a signal for specifying a machine selected by a switch when the program is executed manually and to temporarily store a signal, from each machine, decoded by the control means when the program is executed automatically, said control means writing data into and reading data out of the memory means in accordance with a predetermined procedure.

7. An operation control apparatus according to claim 5, wherein said switches are divided into groups, a signal for specifying a machine selected by a switch comprising a switch address for addressing a specific switch group and switch data for specifying a specific switch in a switch group addressed by said switch address, said light emitting elements being divided into groups, a signal from each machine comprising an LED address for addressing a specific LED group and LED data for specifying a specific light emitting elements in an LED group addressed by said switch address.

* * * * *

UNITED STATES PATENT AND TRADEMARK OFFICE
CERTIFICATE OF CORRECTION

PATENT NO. : 4,679,135
DATED : July 7, 1987
INVENTOR(S) : TAKESHI KOBAYASHI ET AL It is certified that error appears in the above-identified patent and that said Letters Patent is hereby corrected as shown below:

On the cover page, Item [73], change "The Japan Tobacco & Salt Public Corporation" to --- Japan Tobacco Inc. ---.

Signed and Sealed this

Ninth Day of February, 1988

*Attest:*

DONALD J. QUIGG

*Attesting Officer*  *Commissioner of Patents and Trademarks*